E. E. HANLY.
BED PAN.
APPLICATION FILED OCT. 31, 1910.
1,006,653.
Patented Oct. 24, 1911.
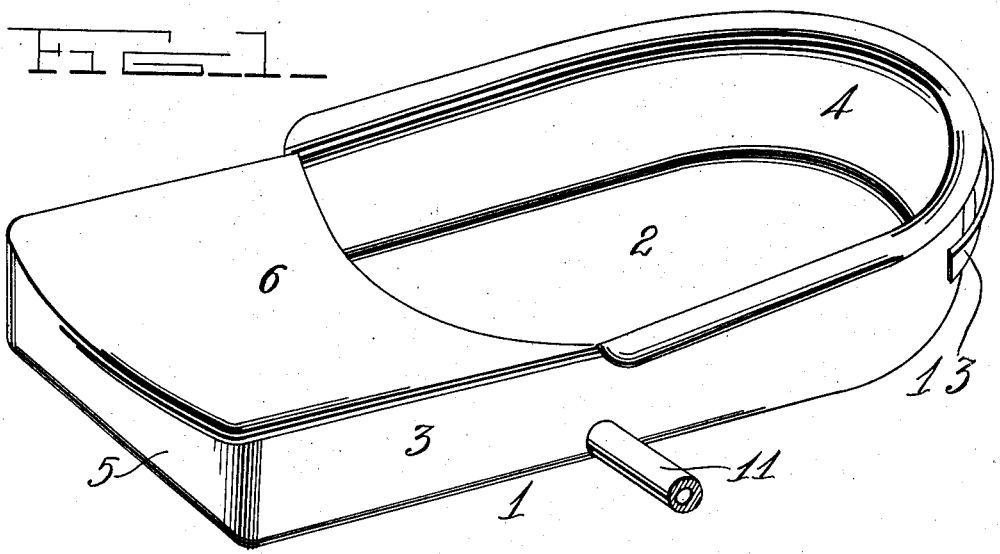
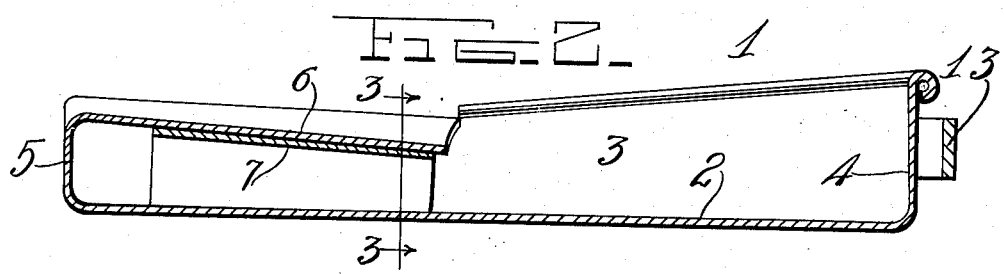
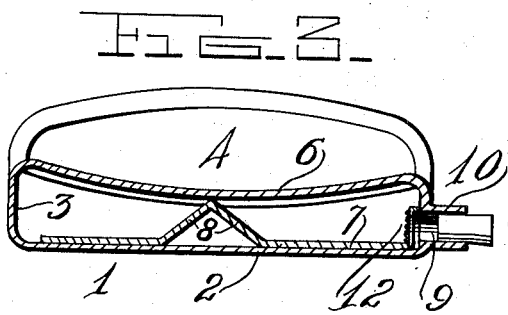 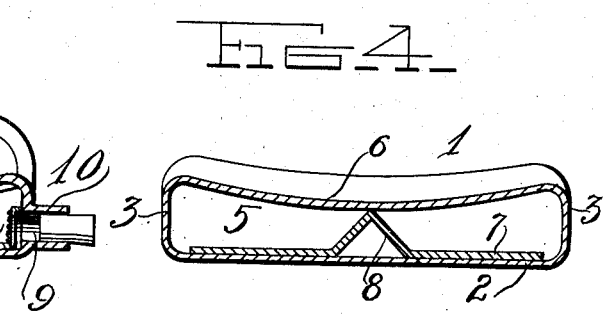
Witnesses
J. R. Pierce
O. B. Hopkins
Inventor
Ellen E. Hanly.
by H. B. Willson & Co
Attorneys

UNITED STATES PATENT OFFICE.

ELLEN E. HANLY, OF MOBILE, ALABAMA.

BED-PAN.

1,006,653.  Specification of Letters Patent.  Patented Oct. 24, 1911.

Application filed October 31, 1910. Serial No. 589,978.

*To all whom it may concern:*

Be it known that I, ELLEN E. HANLY, a citizen of the United States, residing at Mobile, in the county of Mobile and State of Alabama, have invented certain new and useful Improvements in Bed-Pans; and I do declare the following to be a full, clear, and exact description of the invention, such as will enable others skilled in the art to which it appertains to make and use the same.

This invention relates to improvements in bed pans.

One object of the invention is to provide a bed pan having an improved construction of body support upon which the back of the patient may comfortably rest while the pan is in use.

Another object is to provide a pan having means to prevent the spilling or splashing of water therefrom and means whereby the water may be rapidly drawn from the pan thereby permitting the use of the same as a douche pan whereby any quantity of water may be employed in the operation without necessitating the removal of the pan for emptying.

Still another object is to provide a pan of this character having an opening sufficiently large to permit the use of the pan for bathing the parts without danger of wetting the bedding.

With these and other objects in view, the invention consists of certain novel features of construction, combination and arrangement of parts as will be more fully described and particularly pointed out in the appended claim.

In the accompanying drawings: Figure 1 is a perspective view of a bed pan constructed in accordance with my invention. Fig. 2 is a vertical longitudinal section of the same. Fig. 3 is a cross section on the line 3—3 of Fig. 2. Fig. 4 is a similar view looking in the opposite direction.

Referring more particularly to the drawings: 1 denotes my improved bed pan which is preferably formed of metal but which may be constructed of any suitable material. When formed of metal the pan may be enameled or finished in any manner to prevent corrosion. The pan comprises a flat bottom 2 of oblong shape having its forward end preferably rounded, as shown. The bottom 2 is provided on its sides and ends with continuous, upwardly projecting side flanges 3 and end flanges 4 and 5 of suitable height to provide a pan of the desired depth. The side flanges 3 increase in width from the rear toward the forward end of the pan, and the flange 4 at the forward end is of considerably greater height than the rear end flange 5, for a purpose hereinafter described. The rear flat end flange 5 has its upper edge curved downwardly from the opposite sides toward the center of the pan. Over the rear portion of the pan is arranged a cover plate 6 the side edges of which have a fluid tight connection with the upper edges of the side flanges 3 of the pan while the rear edge of the plate 6 has a similar connection with the rear end flange 5 of the pan. The plate 6 is depressed or curves downwardly from its side edges toward the center to fit the curvature of the upper edge of the rear end flange 5 thereby forming a comfortable rest or support for the patient while the pan is in use. The cover plate extends a sufficient distance over the forward end of the receptacle to provide a pocket or receptacle of the desired size. The plate 6 is supported and rigidly braced along the center of the pan by a brace plate 7 which is secured to the bottom of the pan and extends from one side to the other as shown. The brace plate is bent upwardly at the center in the form of an inverted V shaped arch 8 the apex of which engages and is secured to the underside of the plate 6 as shown. The brace plate 7 also serves to strengthen and impart rigidity to the pan. It is further to be noted by referring particularly to Fig. 2, of the drawings, that the supporting plate 7 is considerably shorter than the length of the cover plate 6, whereby the contents of the pan and its entire capacity utilized to the end 5 thereof.

In one of the side flanges of the pan is formed a water discharge passage 9 which is provided with a nipple 10 to which is adapted to be attached a flexible water discharging tube 11 whereby the liquid contents of the pan may be conducted to a suitable receptacle provided to receive the same.

Over the discharge passage 9 inside the pan is arranged a suitable strainer 12 whereby the passage is prevented from becoming clogged up by any solid matter in the pan. The passage 9 may be closed in any suitable manner but is preferably closed by an ordinary stopper or cork.

On the forward end of the pan is preferably arranged a handle 13 whereby the pan may be conveniently carried.

My improved pan when in use will lie flat and does not require holding to prevent the same from tilting. The low flange and sides at the rear end of the pan together with the curvature of the cover plate over the same forms a comfortable rest for the patient while the high flange at the forward end prevents water from splashing or being spilt from the pan. The large opening and high end flange at the forward end of the pan facilitate the use of the same for bathing the patient and if desired the stopper may be placed in the nipple of the discharge passage and water thus retained in the pan for bathing purposes.

The pan is especially adapted for use in administering rectal or vaginal douches as by connecting the discharge passage of the pan with a suitable receptacle any quantity of water desired may be used for the douche without danger of running the pan over or necessitating its removal for emptying before the operation is completed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim is:

A device of the character described comprising a pan composed of a bottom and a flat end wall having a curved upper edge, a cover plate arranged over the said wall and the rear portions of the side flanges of the pan, said cover plate being disposed at an incline toward the inner curved edge of the end wall, a V-shaped supporting arched plate extending longitudinally under the cover plate and having its apex in contact therewith, said supporting plate being shorter than the length of the cover plate whereby the contents of the pan may freely circulate therein, a discharge tube leading from one side of the pan for discharging the contents thereof, and a strainer secured to the pan and covering the opening therein leading from said discharge pipe.

In testimony whereof I have hereunto set my hand in presence of two subscribing witnesses.

ELLEN E. HANLY.

Witnesses:
JOHN C. HENRY,
WM. V. BERORYM.